Sept. 10, 1940.    A. B. NEWTON    2,214,700
CONTROL APPARATUS
Filed Dec. 31, 1937    2 Sheets-Sheet 1

Fig. 1

Inventor
Alwin B. Newton
George H. Fisher
Attorney

Sept. 10, 1940.              A. B. NEWTON                2,214,700
                           CONTROL APPARATUS
                         Filed Dec. 31, 1937            2 Sheets-Sheet 2

Inventor
Alwin B. Newton
By George H Fisher
Attorney

Patented Sept. 10, 1940

2,214,700

UNITED STATES PATENT OFFICE 2,214,700

CONTROL APPARATUS

Alwin B. Newton, Minneapolis, Minn., assignor to Minneapolis-Honeywell Regulator Company, Minneapolis, Minn., a corporation of Delaware Application December 31, 1937, Serial No. 182,817

12 Claims. (Cl. 236—44)

This invention relates in general to air conditioning and is more particularly concerned with the control of temperature and humidity conditions within a conditioned space for maintaining a desired effective temperature within such space.

In the art of air conditioning, it has been found that human comfort is dependent upon relative humidity condtions as well as upon the dry bulb temperature of the air. When the relative humidity decreases, the rate of evaporation of moisture from the occupants of the space increases, which has the effect of making the space feel cooler. Conversely, as the relative humidity increases, the rate of evaporation from the occupants is decreased, which causes the space to feel warmer even though the dry bulb temperature has not changed. Consequently, it is desirable to control an air conditioner in accordance with the resultant of temperature and humidity conditions in order to maintain the space conditions comfortable to human occupants. This control in accordance with the resultant or integration of temperature and humidity is known as effective temperature control.

One difficulty which has been experienced in the control of cooling and dehumidifying systems in accordance with the effective temperature of the space is that such systems have been found to allow excessive relative humidity to exist when the space temperature is relatively low. In other words, during cool damp weather the effective temperature will be caused to be sufficiently low, due to the low sensible cooling load, as to prevent the air conditioning system from being placed into operation. At such times, however, the relative humidity may be very excessive which causes the occupants to experience a sensation of dampness even though not being warm. Such excessive humidity conditions also have an undesirable effect upon the objects within the conditioned space as well as causing discomfort to the occupants.

It is, therefore, the primary object of this invention to provide an air condition control system which normally controls an air conditioning system in a manner to maintain a desired effective temperature within the space, and which also provides for operation of the air conditioner for dehumidifying the space when the relative humidity becomes excessive, even though the space temperature may be relatively low.

It is a further object of this invention to provide a system of the type described which graduatingly controls the operation of the air conditioner in accordance with relative humidity whenever the relative humidity becomes excessive.

Another object of this invention is the provision of an air conditioning control system which normally functions to control an air conditioner in accordance with the effective temperature within the space being conditioned and in which the temperature controller is conditioned to control the conditioner alone when the space temperature is high and the relative humidity is low.

Still another object of this invention is the provision of a novel condition control system which provides for the control of a control device in accordance with a plurality of conditions.

Another object of this invention is the provision of a condition control system in which a plurality of condition controllers are arranged to control a single control device and in which the various condition controllers are adapted to act simultaneously or to shift the control of the device from one controller to another automatically.

Other objects of this invention will become apparent from the following description and the appended claims.

For a complete disclosure of this invention, reference is made to the following description and to the accompanying drawings in which.

Figure 1:
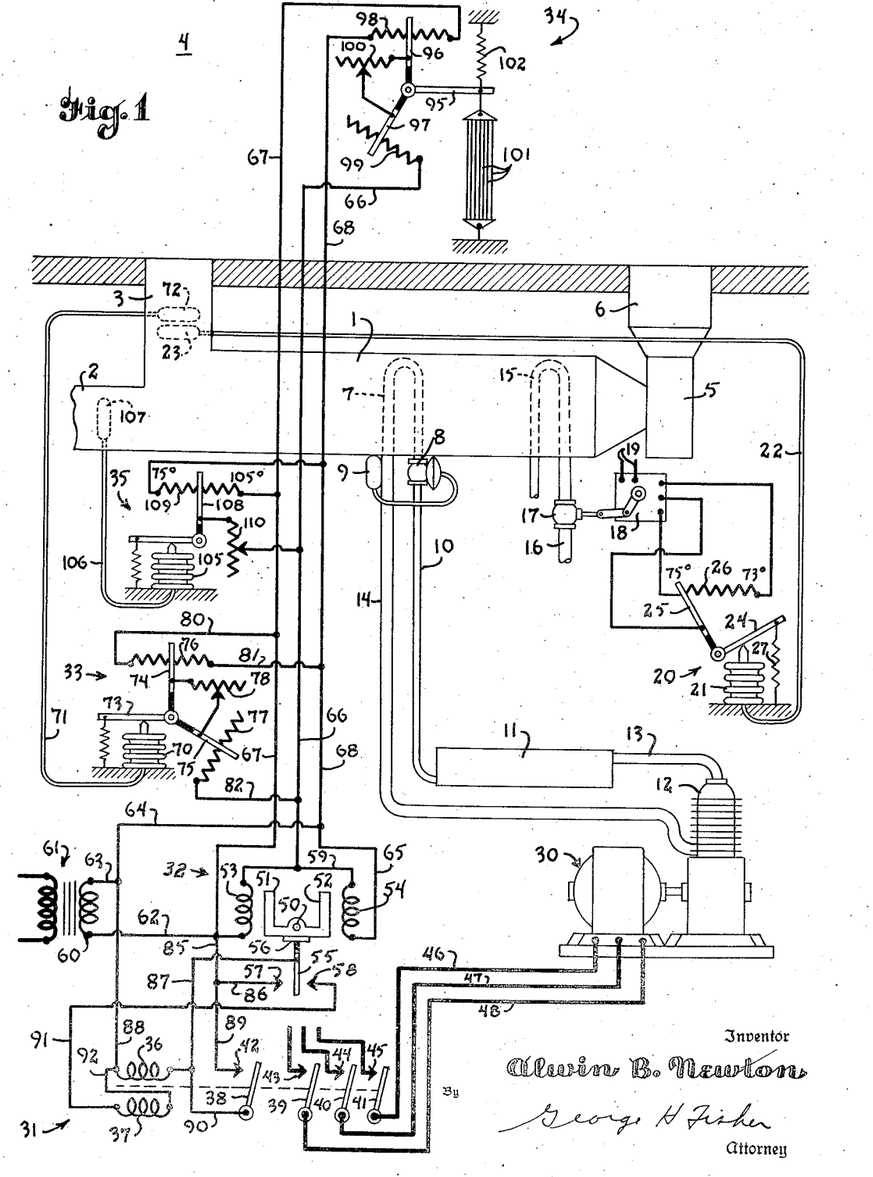
Figure 1 indicates diagrammatically one form of control system to which my invention is applicable.

Figure 1

Referring to Figure 1, reference character 1 indicates an air conditioning chamber having a fresh air inlet 2 and a return air inlet 3 which may lead from a space to be conditioned 4. The discharge end of the conditioning chamber 1 is connected to a fan 5, which in turn is connected to a discharge duct 6 which delivers conditioned air from the chamber 1 to the space 4. Located within the chamber 1 is a cooling coil indicated as 7. The inlet of this cooling coil is connected to a expansion valve 8 which may be of the thermostatic type having a control bulb 9 attached to the cooling coil outlet. The inlet of the expansion valve 8 is connected to a liquid line 10 which leads from a condenser and receiver 11, this condenser in turn being connected to the discharge of a compressor 12 by means of a pipe 13. The outlet or discharge of the cooling coil 7 is connected by means of a suction line 14 to the suction side of the compressor 12. The compressor 12, condenser and receiver 11, and cooling coil 7 therefore form a compression refrigeration system which functions to cause chilling of the cooling coil 7 when the compressor 12 is in operation.

Located in the conditioning chamber 1 on the downstream side of the cooling coil 7 is a reheater coil 15. This reheater coil may be supplied with a suitable heating medium, such as steam, hot water, or uncondensed high pressure refrigerant by means of a supply pipe 16, the supply of heating medium to the coil 15 being controlled by means of a valve 17. This valve in turn may be positioned by means of a proportioning type motor 18. This motor may be of any suitable type and is preferably of the type shown and described in Patent No. 2,028,110 issued to Daniel G. Taylor on January 14, 1936. This type of motor is adapted for connection to a source of power such as by wires 19, and is also adapted to assume intermediate positions under the control of a potentiometer type of controller. In this instance, the motor 18 is controlled by means of a potentiometer type thermostat 20. This thermostat may be formed of a bellows 21 which is connected by a capillary tube 22 to a control bulb 23 located within the return air duct 3. While the bulb 23 is preferably located in the return air duct, it may be placed in the discharge duct 6 or within the conditioned space. The bulb, tube, and bellows are charged with a suitable volatile fill for causing the pressure within the bellows 21 to vary with the temperature at the bulb 23. The bellows 21 may actuate a bell-crank lever having an actuating arm 24 and a control arm 25 which is adapted to slide across a resistance 26. The actuating arm 24 may be connected to a spring 27 for biasing it against the action of the bellows 21. It will be apparent that as the space temperature increases the pressure within the bellows 21 will increase, which causes the arm 25 to slide to the left across the resistance 26, while upon decrease in temperature, the opposite action will take place. This instrument may be so designed and adjusted as to cause the arm 25 to engage the left-hand end of the resistance 26 when the space temperature is above 75°, while engaging the right-hand end of the resistance 26 when the space temperature falls to 73°. As shown, the two ends of the potentiometer resistance and the slider 25 are connected to the motor 18. When the space temperature is above 75°, the arm 25 will engage the left-hand end of the resistance 26, as shown, which causes the proportioning motor 18 to drive the valve 17 to completely closed position for preventing flow of heating medium to the reheater 15. However, as the space temperature falls below 75°, the control arm 25 will begin shifting to the right across the resistance 26 and the proportioning motor 18 will follow up this movement for opening the valve 17 an amount proportionate to the movement of the slider 25 from the off position. By this arrangement, the reheater 15 will be placed out of operation whenever the space temperature is above 75° and will be placed into operation when the space temperature falls below this value, the amount of heating fluid supplied to the reheater being graduatingly controlled in a manner to maintain a substantially constant space temperature when reheat is required.

The compressor 12 may be driven by means of an electric motor 30. This motor may be stopped and started by means of a magnetic starter or relay generally indicated as 31, this starter being controlled by means of a balancing relay 32 which is controlled by the conjoint action of a return air temperature controller 33, a space relative humidity controller 34, and a fresh air thermostat 35 in a manner to maintain an effective temperature within the conditioned space which is varied in value in accordance with changes in outside temperature.

Referring to the compressor starter 31, this device includes a pair of oppositely wound coils 36 and 37. These coils are adapted to actuate an armature, not shown, which in turn actuates switch arms 38, 39, 40 and 41 which cooperate with contacts 42, 43, 44, and 45, respectively. The contacts 43, 44 and 45 may be connected to suitable power wires as indicated and the switch arms 39, 40 and 41 may be connected to the motor 30 by means of wires 46, 47 and 48. When the coil 36 is energized, it will pull the armature to the left thereby bringing the switch arms 38 to 41 into engagement with their respective contacts. Engagement of the switch arms 39, 40 and 41 with their contacts will complete a power circuit to the motor 30 and thereby place the compressor 12 into operation. Engagement of the switch arm 38 with the contact 42 will complete a maintaining circuit for the coil 36, as will be described later. When the coil 37 is energized, its magnetic flux will counteract the magnetic flux of the coil 36 which will permit the switch arms 38 to 41 to be shifted to the right away from their contacts under the action of gravity or springs, not shown. This will place the compressor 12 out of operation.

Referring to the balancing relay 32, this instrument may comprise a U-shaped armature which is pivoted at 50 and which has legs 51 and 52 which are located within the influence of relay coils 53 and 54, respectively. The armature 50 carries a switch arm 55, an insulating member 56 being interposed between the armature and the switch arm. This switch arm is adapted to cooperate with opposed contacts 57 and 58. The relay coils 53 and 54 are connected together at their upper ends by means of a wire 59 and are connected in series across the secondary 60 of a step-down transformer 61 by means of wires 62, 63, 64 and 65. In addition, the wire 59 which connects the upper ends of these coils is connected to a control wire 66 which leads to the potentiometers of the potentiometer type controllers 33, 34 and 35. Also, the lower end of the relay coil 53 is connected to a control wire 67 and the lower end of the relay coil 54 is connected through wire 65 to a control wire 68, the control wires 67 and 68 also leading to the potentiometer type controllers. The controllers 33, 34 and 35, in a manner which will be described, function to vary the relative energizations or flow of current through the relay coils 53 and 54. When the relay coils 53 and 54 are equally energized, the relay armature will assume mid position at which the switch arm 55 is disengaged from both contact 57 and contact 58. When the current flow in the relay coil 53 is greater than that through coil 54, the leg 51 of the armature will be pulled upwardly thereby causing clockwise movement of the armature for bringing the switch arm 55 into engagement with the contact 57. Conversely, when the coil 54 is energized more highly than coil 53, the switch arm 55 will engage the contact 58.

Referring to the return air temperature controller 33, this controller may include a bellows 70 which is connected by a capillary tube 71 to a control bulb 72 located within the return air duct 3. The bulb, tube, and bellows are charged with a suitable volatile fill for causing the pressure within bellows 70 to vary with changes in return air temperature. The bellows 70 actuates a pivoted arm 73, which arm actuates a control arm 74 and an auxiliary arm 75, the arms 74 and 75 being insulated from each other and cooperating with resistances 76 and 77, respectively. The arms 74 and 75 are also connected together through a rheostat 78. It will be apparent that as the return air temperature increases, the bellows 70 will expand, thus causing clockwise movement of the arms 74 and 75 across the resistances 76 and 77. Upon fall in return air temperature, however, the bellows 70 will contract under the action of a spring 79 for causing movement of the arms 74 and 75 in the opposite direction. The left-hand end of the resistance 76 is connected by wire 80 to the control wire 67, and the right-hand end of this resistance is connected to the control wire 68 by means of wire 81. The control resistance 76 is therefore connected across the secondary 60 of the transformer 61 in parallel with the series connected relay coils 53 and 54. The lower end of the resistance 77 is connected to the control wire 66 by means of wire 82. This acts to connect the arm 74 to the junction of wire 59 of the relay coils 53 and 54. This causes the arm 74 to connect one portion of the resistance 76 in parallel with the relay coil 53 and to connect the remaining portion of this resistance in parallel with the relay coil 54. For instance, the left-hand portion of the resistance 76 is connected in parallel with the relay coil 53 by the following circuit: upper end of relay coil 53, wire 59, wire 66, wire 82, resistance 77, arm 75, rheostat 78, arm 74, left half of resistance 76, wire 80, and wire 67 to the lower end of relay coil 53. In a similar manner, the right-hand portion of resistance 76 is connected in parallel with the relay coil 54.

With the arm 74 in the position shown, the return air temperature is at an intermediate value as indicated by the arm 74 engaging the center of resistance 76. For this position, equal portions of the resistance 76 are connected in parallel with the relay coils 53 and 54. Due to the fact that the controllers 34 and 35 are also in mid position, the relay coils 53 and 54 are equally energized, this causing the switch arm 55 to be disengaged from the contacts 57 and 58. If the return air temperature should increase, the arm 74 will be shifted to the right across the resistance 76, thereby decreasing the portion of this resistance which is connected in parallel with relay coil 54 and increasing the portion of the resistance which is connected in parallel with relay coil 53. This will have the effect of decreasing the current flow in coil 54 and increasing the current flow in coil 53, which will cause rotation of the relay armature for bringing the switch arm 55 into engagement with contact 57. This action will cause energization of the starter coil 36 as follows: transformer secondary 60, wire 62, wire 85, wire 86, contact 57, switch arm 55, wire 87, starter coil 36, wire 88, and wire 63 to the transformer secondary. This action will cause engagement of the switch arms 38 to 41 with their respective contacts for thereby placing the compressor 12 into operation.

Engagement of the switch arm 38 with the contact 42 will establish a maintaining circuit for the starter coil 36 as follows: transformer secondary 60, wire 62, wire 85, wire 89, contact 42, switch arm 38, wire 90, starter coil 36, wire 88, and wire 63 back to the transformer secondary. This maintaining circuit, it will be noted, is independent of the switch arm 55 and the contact 57. Consequently, the coil 36 will remain energized and the compressor 12 will remain in operation even though the switch arm 55 becomes disengaged from contact 57.

Due to the operation of the compressor 12, the space temperature will gradually begin falling. As the space temperature falls, the arms 74 and 75 will be shifted in a counter-clockwise direction across their resistances. Due to this movement of the arm 74 on the resistance 76, the portion of ersistance 76 which is in parallel with the relay coil 53 will be decreased and the portion of this resistance which is in parallel with the relay 54 will be increased. This will, therefore, act to progressively increase the current flow in relay coil 54 and to decrease the current flow in relay coil 53 as the space temperature rises. Therefore, as the space temperature rises, the relay armature will rotate in a counter-clockwise direction. The first action will be to disengage switch arm 55 from the contact 57. Due to the maintaining circuit for the starter coil 36 through the switch arm 38 and contact 42, the starter coil 36 will remain energized and consequently the compressor 12 will remain in operation. When the space temperature falls a predetermined amount, for instance 2° F., the relay armature will have rotated sufficiently to bring the switch arm 55 into engagement with the contact 58. This will energize the bucking coil 37 of the compressor starter as follows: transformer secondary 60, wire 62, wire 85, wire 89, contact 42, switch arm 38, wire 90, wire 87, switch arm 55, contact 58, wire 91, bucking coil 37, wire 92, wire 88, and wire 63 to the transformer secondary 60. Energization of the bucking coil 37 will neutralize the magnetic field of the starter coil 36, consequently causing disengagement of the switch arms 38 to 41 with their respective contacts. This will deenergize the compressor motor 30 and thus place the compressor out of operation. This will also break the energizing circuits for the coils 36 and 37.

From the foregoing, it will be apparent that the controller 33 will act to cause intermittent operation of the compressor in a manner to maintain the space temperature within predetermined limits, the compressor being started when the space temperature rises to a predetermined value and being placed out of operation when the space temperature is reduced to a desired lower value.

Referring to the humidity controller 34, this instrument may comprise an actuating arm 95 which actuates a pair of arms 96 and 97 which are insulated from each other. The arm 96 cooperates with a resistance 98 for forming a potentiometer and the arm 97 cooperates with a resistance 99 for forming an auxiliary rheostat. The arms 96 and 97 are also connected together through an adjusting rheostat 100. The arm 95 may be actuated by any suitable type of humidity responsive device, such device being indicated herein as comprising a plurality of strands 101 of hair or other moisture responsive material, these strands being secured together by suitable clamping members, the lower clamping member being anchored while the upper clamping member is connected to the arm 95. Also, a spring 102 is connected to the actuating arm 95 for biasing this arm against the action of the strands for maintaining the strands taut. When the relative humidity increases, the strands 101 will increase in length thereby permitting counter-clockwise rotation of the arms 96 and 97 across their respective resistances under the action of spring 102. Upon decrease in humidity, the strands 101 will shrink for causing rotation of the arms 96 and 97 in the opposite direction.

The right-hand end of the resistance 98 is connected to the control wire 67 of relay 32 and the left-hand end of this resistance is connected to the control wire 68. The lower end of the resistance 99 is connected to the control wire 66. The humidity controller 34 is therefore connected to the balancing relay in parallel with the return air temperature controller 33. It will be apparent that as the relative humidity increases, the controller 34 will have the same effect upon the relay 32 as the controller 33 will have upon an increase in space temperature. In other words, when the relative humidity increases, the humidity controller will cause the current flow in relay coil 54 to be decreased and the current flow in relay coil 53 to be increased, which will have the effect of placing the compressor 12 into operation. Operation of the compressor 12 will cause chilling of the cooling coil 7 for cooling and dehumidifying the air which will result in the space temperature and relative humidity being reduced. This reduction in space temperature and relative humidity will act upon the temperature controller 33 and humidity controller 34 in a manner to cause the current flow in relay coil 54 ot be increased and that in coil 53 to be decreased. When the effective temperature within the space again reaches the desired lower value, the relay coil 54 will become sufficiently more energized than coil 53 as to cause the switch arm 55 to engage contact 58, which will place the compressor out of operation. The increase in relative humidity therefore causes the compressor to be placed into operation, and the compressor will remain in operation until the resulting decrease in temperature and relative humidity causes the effective temperature of the space to be returned to the desired value. Upon a decrease in relative humidity alone it will be apparent that the humidity controller 34 will cause the relay coil 54 to be energized more highly than coil 53. This is the opposite effect on the relay to that caused by an increase in temperature. Therefore, a higher temperature will be required to cause the relative energization of the relay coils to be returned to their former relationship. A decrease in relative humidity will therefore have the effect of raising the standard of dry bulb temperature maintained.

It will be noted that the controller 33 is provided with an adjusting rheostat 78 and the humidity controller 34 is provided with a similar adjusting rheostat 100. These rheostats vary the amount of resistance in series with the control arms 74 and 96 and consequently vary the amount of current flowing through these arms. It will be apparent that these rheostats provide for adjustment of the effect of each instrument upon the relay 32. For instance, if the rheostat 78 is adjusted to the minimum resistance position, the effect of a given movement of the control arm 74 across the resistance 76 upon the relay 32 will be greater than if the rheostat is adjusted for placing resistance in series with the arm 74. By properly adjusting the rheostats 78 and 100, the relative or combined effect of the temperature controller and the humidity controller may be made such as to cause the temperature maintained within the space to follow or remain within the comfort zone. In other words, a decrease in relative humidity will result in the space temperature being increased an amount just sufficient to compensate for the effect upon human comfort of the decrease in relative humidity, and vice versa. The rheostats 78 and 100 also provide for adjusting the control system to adapt it to the particular locality in which the system is installed. While it is preferable to utilize adjustable resistances or rheostats for this purpose, it will be apparent that if desired, fixed resistances of suitable value could be substituted in place of the rheostats 78 and 100. Also while these rheostats have been shown as interposed between the arms of the controllers, these rheostats may be located at other points in the circuit.

Referring to the outdoor temperature controller 35, this controller may be similar in construction to the controller 20 and includes a bellows 105 connected by a tube 106 to a bulb 107 in the fresh air duct 2. This bellows actuates a control arm 108 which cooperates with a resistance 109 to form a control potentiometer. When the outdoor temperature rises, the bellows 105 will expand for causing movement of the arm 108 to the right across resistance 109, and upon fall in outdoor temperature opposite movement of arm 108 will take place. This instrument may be so designed and adjusted as to cause the arm 108 to engage the left-hand end of resistance 109 when outdoor temperature is at 75° F. or below, while engaging the right-hand end of the resistance 109 when the outdoor temperature rises to 105° F. The arm 108 is connected through a rheostat 110 to the control wire 66 of relay 32. The left-hand end of the resistance 109 is connected to the control wire 68 and the right-hand end of this resistance is connected to the control wire 67 as shown. The potentiometer of the thermostat 35 is therefore connected to the relay 32 in parallel with the potentiometers of the temperature controller 33 and the humidity controller 34.

When the outdoor temperature increases, the control arm 108 will shift to the right across resistance 109, thereby decreasing the portion of the resistance 109 which is in parallel with the relay coil 53 and increasing the portion which is in parallel with the relay coil 54. This will increase the energization of relay coil 54 while decreasing the energization of coil 53, which will cause movement of the switch arm 55 towards the contact 58. Consequently, if the compressor should be in operation at this time, it would be placed out of operation for allowing the space temperature to rise. If the compressor is not operating at this time, this action will nevertheless require that either the space temperature or relative humidity rise to a higher value than before, in order that the switch arm 55 be brought into engagement with contact 57 for starting the compressor. An increase in outdoor temperature will therefore result in raising the standard of effective temperature maintained by the temperature controller 33 and the humidity controller 34. Conversely, a decrease in outdoor temperature will result in lowering the standard of effective temperature maintained. The purpose of the controller 35 is to shift the standard of effective temperature maintained in accordance with changes in outdoor temperature to thereby keep the standard of effective temperature maintained within the comfort zone. By adjusting the rheostat 110, the effect of the controller 35 upon the relay 32 may be varied so as to secure the desired change in inside temperature for a given change in outdoor temperature.

Referring again to the temperature controller 33, it will be noted that as this controller assumes a satisfied position, the amount of the re- the space temperature falls, the portion of the sistance 77 which is inserted in series with the control arm 74 is increased. In other words, as the space temperature falls, the portion of the resistance 77 which is interposed between the arm 74 and the junction of the relay coils 53 and 54 is increased. As pointed out previously, the insertion of resistance in series with the arm 74 will have the result of reducing the effect of the controller 33 upon the relay 32. Consequently, as the return air temperature falls to the minimum setting of the controller 33, this controller will automatically reduce its effect upon the relay 32. Due to this reduction in control effect of the controller 33, the humidity controller 34 will be conditioned so as to dominate the controller 33 as the relative humidity increases.

Referring to the humidity controller 34, it will be noted that as the relative humidity increases, the resistance 99 is gradually cut out of the circuit between the control arm 96 and the junction of the relay coils 53 and 54. This will have the result of increasing the effect of the humidity controller on the relay 32. Consequently, when the space temperature is low and the relative humidity is high, the relative humidity controller 34 will have a much greater effect upon the relay 32 than has the return air temperature controller 33. This will permit the humidity controller 34 to cause starting of the compressor 12 when the humidity becomes excessive even though the space temperature is relatively low. If the resulting operation of the compressor 12 should cause the space temperature to fall below the desired value, the reheater thermostat 20 will cause operation of the reheater 15 in a manner to provide just sufficient reheat as to maintain the desired space temperature.

From the foregoing, it will be apparent that my improved form of control circuit provides for maintaining a predetermined standard of effective temperature within the conditioned space so long as neither the space temperature nor the relative humidity becomes excessive. If the relative humidity should become excessive, however, at a time when the space temperature is low and consequently the effective temperature is not excessive, the effect of the humidity controller will be increased so as to enable this controller to place the compressor into operation, thereby providing for reducing the relative humidity to a more desirable value, overcooling of the space at this time being prevented by the reheater.

Figure 2:
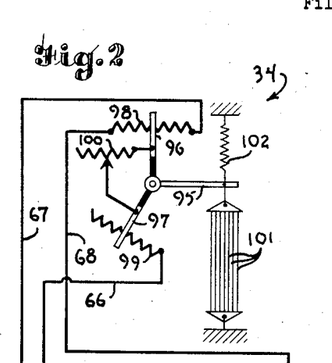
Figure 2 diagrammatically illustrates a modified form of control system.

Figure 2

In Figure 2, I have shown my novel control apparatus applied to an air conditioning system utilizing a variable speed compressor instead of a constant speed compressor as shown in Figure 1. In this figure, the air conditioning system itself, the return air temperature controller 33, the humidity controller 34, the outdoor temperature controller 35, and the balancing relay 32 are exactly the same as shown in Figure 1 and hence are not described here in detail. These parts are all provided with the same reference characters as appear in Figure 1.

In this embodiment of the invention, the balancing relay 32 instead of controlling a compressor starter, forms a part of a proportioning motor of the type shown in the Taylor patent previously referred to. This motor includes a main operating shaft 111 which is driven through a gear train 112 by a reversible electric motor which may comprise a pair of armatures 113 and 114 which cooperate with field coils 115 and 116. The armature 113 and the field coil 115 form a motor for driving the shaft 111 in one direction, while the armature 114 and the field coil 116 form a motor for driving the shaft in the other direction.

The shaft 111 in this case carries a series of cams 117, 118 and 119 which actuate pivoted mercury switch carriers 120, 121 and 122 which carry mercury switches 123, 124 and 125, respectively. The cams 117, 118 and 119 are so arranged upon the shaft 111 as to cause closing of the mercury switches 123, 124 and 125 in sequence as the shaft 111 is rotated in a clockwise direction. The mercury switches 123, 124 and 125 are connected to a suitable three speed control box which varies the speed of the compressor motor 30. With the type of speed controller illustrated, when all of the mercury switches are open, the compressor motor 30 will be placed out of operation. As the shaft 111 is rotated clockwise, the mercury switch 123 will first be closed which will complete a low speed circuit through the control box causing the compressor motor to operate at low speed. As the shaft 111 is rotated still further, the mercury swith 124 will be closed for completing an intermediate speed circuit through the control box, and upon still further rotation of the shaft 111 the mercury switch 125 will be closed for operating the compressor at high speed. The position assumed by the shaft 111 therefore controls the speed at which the compressor is operated.

The shaft 111 also carries a balancing arm 126 which cooperates with a balancing resistance 127 to form a balancing potentiometer which cooperates with the controllers 33, 34 and 35 in controlling the relative energizations of the relay coils 53 and 54 of the balancing relay 32. The balancing arm 126 is connected by a wire 128, rheostat 129, and wire 130 to the control wire 66 of relay 32. The upper end of the balancing resistance 127 is connected to the control wire 66 by wire 131, and the lower end of this balancing resistance is connected to the control wire 68 by means of a wire 132, a resistance 133 being interposed in this wire. The balancing potentiometer formed of arm 126 and resistance 127 is therefore connected to the relay 32 in parallel with the potentiometer controllers 33, 34 and 35.

With the parts in the position shown, the space temperature, relative humidity, and outside temperature are at intermediate values as indicated by the control arms 74, 96 and 108, of the controllers 33, 34 and 35 engaging the centers of their respective resistances. Also, the shaft 111 is mid way between its two limits of rotation as indicated by the balancing arm 126 engaging the center of the balancing resistance 127. For these positions of the various potentiometers, the relay coils 53 and 54 are equally energized, and consequently the switch arm 55 is disengaged from contact 57 and contact 58 which causes the motor fields 115 and 116 to be deenergized. For the position of shaft 111 illustrated, the mercury switch 123 is closed and therefore the compressor is operating at low speed.

If the space temperature should increase, the control arm 74 of the controller 33 will shift to the right across resistance 76, this reducing the portion of this resistance which is in parallel with relay coil 54 and increasing the portion of this resistance which is in parallel with relay coil 53. This will increase the current flow through reay coil 53 and decrease the current flow in coil 54, which causes rotation of the armature for bringing switch arm 55 into engagement with contact 57. This will energize the motor field 116 as follows: transformer secondary 60, wire 62, wire 86, switch arm 55, contact 57, wire 135, motor field 116, wire 186, and wire 63 back to the transformer secondary. Energization of the motor field 116 will cause driving of the shaft 111 in a clockwise direction which will have the effect of increasing the compressor speed. As the shaft 111 rotates in a clockwise direction, the balancing arm 126 will move upwardly across the balancing resistance 127 which will decrease the portion of this resistance in parallel with the relay coil 53 and increase the portion of this resistance in paralel with coil 54. This will, in turn, decrease the energization of coil 53 and increase the energization of coil 54, thereby tending to balance out the initial unbalancing action of the temperature controller 35 on the relay. When the shaft 111 has rotated sufficiently to cause this initial unbalancing action to be balanced out, the switch arm 55 will disengage the contact 57 for deenergizing the motor field 116. The shaft 111 will therefore be rotated an amount proportionate to the movement of the arm 74 of the controller 33 along the resistance 76. Thus, the rotation of shaft 111 is proportionate to the increase in temperature. It will be apparent that as the space temperature increases further, the shaft 111 will be rotated further and finally operate the compressor at high speed. It will also be apparent that upon temperature fall the controller 33 will cause the energization of relay coil 54 to become greater than that of coil 53 for causing the switch arm 55 to engage contact 58 which will energize the motor field 115 for driving the shaft 111 in a counter-clockwise direction which will reduce the speed of the compressor. The temperature controller 33 therefore acts to progressively or graduatingly increase the compressor speed as the space temperature increases and to decrease the compressor speed as the space temperature decreases, this action tending to maintain a constant space temperature.

It will be noted that the rheostat 129 is interposed between the balancing arm 126 and the junction of the relay coils 53 and 54. The purpose of this rheostat is to decrease the sensitivity of the balancing potentiometer. This decreasing of the balancing potentiometer sensitivity will result in causing the shaft 111 to be rotated from one extreme position to the other for but a partial movement of the control arm 74 upon its resistance 76. The rheostat 129 therefore acts to increase the sensitivity of the controller 33 and the other controllers. By properly adjusting this rheostat, the proper movement of shaft 111 for a given change in position of the controllers may be obtained so as to maintain proper conditions within the space.

The actions of the humidity controller 34 and the outside controller of compensator 35 are exactly the same as in Figure 1. In other words, if the relative humidity should increase, the compressor speed will be increased which will cause the space temperature to be lowered, and should the outdoor temperature increase, the compressor speed will be decreased for permitting the space temperature to rise to a higher value. Thus in this embodiment of the invention, the compressor 10 is controlled by the resultant effect of temperature and humidity for maintaining a desired standard of effective temperature, this standard of effective temperature being raised or lowered in accordance with outdoor temperature. Also, due to the action of the arms 75 and 97 of the controllers 33 and 34 in varying the relative effect of these instruments upon the proportioning motor relay, the compressor may be caused to operate when the relative humidity becomes excessive even though the space temperature may be relatively low. Under these conditions, the compressor speed will be graduatingly controlled by the humidity controller alone for returning the relative humidity to a more desirable value. Also, with this system the temperature controller may assume substantially full command over the proportioning motor when the relative humidity is low and modulate the compressor speed to prevent the space temperature from becoming excessive even though the relative humidity may be low.

Figure 3:
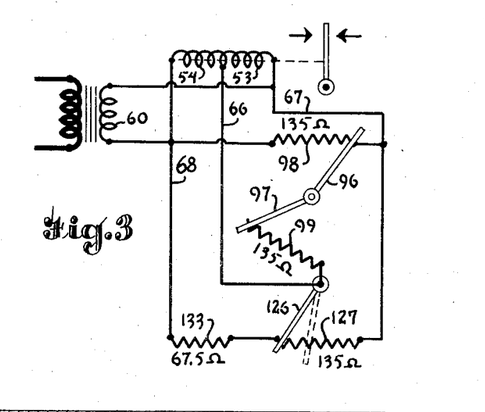
Figure 3 is a fragmentary wiring diagram of a portion of the complete control system.

Referring to Figure 3, the purpose of the resistance 133 will be explained. In this figure only the balancing relay, the balancing potentiometer, and the humidity controller potentiometer are shown. When the humidity controller potentiometer assumes the extreme low position, it will be noted that the amount of resistance in parallel with the relay coil 53 is half the value of the resistance which is connected in parallel with relay coil 54. For instance, assuming the resistances 98 and 99 are 135 ohms each, there will be a resistance of 135 ohms in parallel with coil 53 and a resistance of 270 ohms in parallel with the coil 54. Tracing the parallel resistance path for relay coil 53, this path includes wire 67, arm 96, arm 97, resistance 99, and wire 66. Thus, the resistance 99 is in parallel with relay coil 53. Tracing the parallel resistance path of relay coil 54, this path includes wire 68, resistance 98, arm 96, arm 97, resistance 99, and wire 66. Thus, the resistances 98 and 99 in series are connected in parallel with coil 54 while only the resistance 99 is in parallel with coil 53. For this two-to-one relationship of the parallel resistance paths for relay coils 53 and 54, it would only be necessary for the balancing arm 126 to divide the balancing resistance 127 in the reverse two-to-one relationship in order to equalize the energizations of relay coils 53 and 54. Thus, the balancing arm 126 would assume the dotted line position shown. Therefore, with the partial circuit shown, when the controller assumes the extreme low position, the proportioning motor instead of assuming an extreme position, would only rotate two-thirds of its travel towards off position. This would have the result of wasting the benefits of one-third of the available motor travel. This result, however, is avoided by the use of the resistance 133 which, in effect, forms an extension to the balancing resistance 127. By making this resistance of half the value of the balancing resistance, the two-to-one relationship is reached when the balancing arm reaches the extreme end or full line position on the balancing resistance instead of the dotted line two-thirds position. The resistance 133 therefore acts to compensate for the effect of the resistance 99. It will be seen that this same two-to-one relationship occurs also for the temperature controller, and is the same regardless of the number of controllers which are connected in parallel. The resistance 99 therefore compensates for the effect of all of the auxiliary resistances of whatever controllers may be connected to the proportioning motor.

From the foregoing, it should be seen that I have provided an automatic control system which will function normally to maintain a predetermined effective temperature within a conditioned space, and in which the standard of effective temperature maintained is raised or lowered in accordance with changes in outdoor temperature for maintaining space conditions within the comfort zone. It should also be seen that my improved control system will provide for increasing the effect of the humidity controller as the space temperature decreases and as the relative humidity increases for thereby enabling the humidity controller to operate the system for producing dehumidification even when the space temperature is relatively low. The system will also act in the reverse manner for conditioning the temperature controller for operating the system to reduce the space temperature from an excessive value even when the relative humidity is low.

While I have shown and described my improved control system as applied to the compressor of a direct expansion type of system, it will be apparent that its application is not limited to any specific type of air conditioning system, and that it may be employed in brine or air washer type of systems and may control valves or suitable dampers of such systems. Also, while my invention is of special utility when applied to a cooling and dehumidifying system, it is obvious that the broader aspects of the invention are not limited to cooling systems or even to air conditioning. This form of control arrangement may be employed whenever it is desirable to control any type of control device in accordance with more than one condition whether the condition responsive devices control simultaneously, or at different times. As many different modifications and applications of my improved form of control apparatus will occur to those skilled in the art, I desire to be limited only by the scope of the appended claims as construed in the light of the prior art.

I claim as my invention:

1. In a system of the class described, in combination, a cooling system including a heat exchange device for cooling or dehumidifying a space, a controller for said heat exchange device, temperature responsive means, humidity responsive means, said temperature responsive means and said humidity responsive means being arranged normally to cooperate in actuating said controller in a manner of maintain a predetermined standard of effective temperature within said space, and means actuated by said temperature responsive means upon the space temperature falling to a predetermined value for conditioning said humidity responsive means to actuate said controller in a direction to place said heat exchange device in operation when the relative humidity becomes excessive, to thereby provide for dehumidification when necessary even though the space temperature is so low as to cause said effective temperature to be below the predetermined value.

2. In a system of the class described, in combination, a cooling system including a heat exchange device for cooling or dehumidifying a space, a controller for said heat exchange device, temperature responsive means, humidity responsive means, said temperature responsive means and said humidity responsive means being arranged normally to cooperate in actuating said controller in a manner to maintain a predetermined standard of effective temperature within said space, and means actuated by said humidity responsive means for lowering the standard of effective temperature maintained within said space as the relative humidity becomes excessive, to thereby place said heat exchange device into operation to reduce the relative humidity even when the space temperature is relatively low.

3. In a system of the class described, in combination, a cooling system including a heat exchange device for cooling or dehumidifying a space, a controller for said heat exchange device, temperature responsive means, humidity responsive means, said temperature responsive means and said humidity responsive means being arranged normally to cooperate in actuating said controller in a manner to maintain a predetermined standard of effective temperature within said space, and means actuated by said humidity responsive means upon the space relative humidity falling to a predetermined value for conditioning said temperature responsive means to actuate said controller in a direction to place said heat exchange device in operation when the space temperature becomes excessive, to thereby provide for sensible heat cooling when necessary even though the space relative humidity is so low as to cause said effective temperature to be below the predetermined value.

4. In a system of the class described, in combination, a cooling system including a heat exchange device for cooling or dehumidifying a space, a controller for said heat exchange device, temperature responsive means, humidity responsive means, said temperature responsive means and said humidity responsive means being arranged normally to cooperate in actuating said controller in a manner to maintain a predetermined standard of effective temperature within said space, means actuated by said temperature responsive means upon the space temperature falling to a predetermined value for conditioning said humidity responsive means to actuate said controller in a direction to place said heat exchange device in operation when the relative humidity becomes excessive, to thereby provide for dehumidification when necessary even though the space temperature is so low as to cause said effective temperature to be below the predetermined value, and means actuated by said humidity responsive means upon the space relative humidity falling to a predetermined value for conditioning said temperature responsive means to actuate said controller in a direction to place said heat exchange device in operation when the space temperature becomes excessive, to thereby provide for sensible heat cooling when necessary even though the space relative humidity is so low as to cause said effective temperature to be below the predetermined value.

5. In a system of the class described, in combination, a cooling system including a heat exchange device for cooling and dehumidifying a space, control means for said heat exchange device, said control means including an electromagnetic actuating device, and relay means for controlling the position assumed by said actuating device, a variable resistance temperature controller connected to said relay means, a variable resistance humidity controller connected to said relay means, said temperature controller and said humidity controller acting normally to control the energization of said relay means in a manner to maintain a predetermined effective temperature in said space, and additional resistance means connected between said relay means and said temperature controller, said additional resistance means being adjusted by said temperature controller for decreasing the relative effect of said temperature controller on said relay means as said space temperature falls to a predetermined value, in a manner to condition said humidity controller for controlling said relay means to place said heat exchange device into operation when the relative humidity becomes excessive even though the space temperature may be relatively low.

6. In a system of the class described, in combination, a cooling system including a heat exchange device for cooling and dehumidifying a space, control means for said heat exchange device, said control means including an electromagnetic actuating device, and relay means for controlling the position assumed by said actuating device, a variable resistance temperature controller connected to said relay means, a variable resistance humidity controller connected to said relay means, said temperature controller and said humidity controller acting normally to control the energization of said relay means in a manner to maintain a predetermined effective temperature in said space, and additional resistance means connected between said relay means and said humidity controller, said additional resistance means being adjusted by said humidity controller for decreasing the relative effect of said humidity controller on said relay means as the relative humidity falls to a predetermined value to thereby condition said temperature controller for placing said heat exchange device in operation when the space temperature becomes excessive even though the relative humidity may be relatively low.

7. In a system of the class described, in combination, a cooling system including a heat exchange device for cooling and dehumidifying a space control means for said heat exchange device, said control means including an electromagnetic actuating device, and relay means for controlling the position assumed by said actuating device, a variable resistance temperature controller connected to said relay means, a variable resistance humidity controller connected to said relay means, said temperature controller and said humidity controller acting normally to control the energization of said relay means in a manner to maintain a predetermined effective temperature in said space, and additional resistance means connected between one of said controllers and said relay means, said additional resistance means being adjusted by one of said controllers in a manner to increase the relative effect of said humidity controller for causing operation of said heat exchange device by said humidity controller even though the space temperature is relatively low.

8. In a system of the class described, in combination, a cooling system including a heat exchange device for cooling and dehumidifying a space, control means for said heat exchange device, said control means including an electromagnetic actuating device, and a relay for controlling the position assumed by said actuating device, said relay including a pair of series connected coils connected to a source of power, a first potentiometer and a second potentiometer connected to said relay coils in a manner to vary the relative energizations of said coils in accordance with the resultant of the action of said potentiometers, temperature responsive means for actuating one of said potentiometers, humidity responsive means for actuating the other potentiometer, said temperature responsive means and said humidity responsive means cooperating normally to adjust their respective potentiometers in a manner to maintain a predetermined effective temperature within said space, and additional means actuated by one of said responsive means, said additional means being connected between one of said responsive means and said relay and arranged to increase the relative effect of the humidity responsive means on said relay for causing operation of said heat exchange device by said humidity responsive means even though the space temperature is relatively low.

9. In a system of the class described, in combination, a condition control device, actuating means for said control device, said actuating means including an electromagnetic actuating device, relay means for controlling the position assumed by said electromagnetic actuating device, a first condition responsive device, a second condition responsive device, a first variable resistance type controller actuated by said first condition responsive device, a second variable resistance type controller actuated by said second condition responsive device, said variable resistance type controllers being arranged in control relationship with said relay means for energizing said relay means in accordance with the resultant of the resistances, and additional variable resistance means interposed in circuit with at least one of said variable resistance controllers and said relay means, said additional variable resistance means being adjusted by one of said condition responsive devices in a manner to vary the relative effect of said condition responsive devices on said relay means in a single direction as the adjusting condition responsive device moves in a single direction through its normal range of movement.

10. In a system of the class described, in combination, a condition control device, actuating means for said control device, said actuating device including an electromagnetic actuating device, a relay for controlling the position assumed by said electromagnetic actuating device, said relay including a pair of series connected coils connected to a source of power, a first potentiometer and a second potentiometer, means connecting said potentiometers in parallel with said coils, means connecting said potentiometer contacts intermediate said coils, a first condition responsive device for actuating one of said potentiometers, a second condition responsive device for actuating the other of said potentiometers, and variable resistance means interposed in circuit with at least one of said potentiometer contacts, said variable resistance means being adjusted by one of said condition responsive devices in a manner to vary the relative effect of said condition responsive devices in a single direction as the adjusting condition responsive device moves in a single direction through its normal range of movement.

11. In a system of the class described, in combination, a device to be controlled and including an energy responsive means, a first condition responsive control device located remotely from said energy responsive means, said first condition responsive control device including a first energy varying means, energy transmitting means between said first energy varying means and said energy responsive means for causing said first condition responsive control device to vary the application of energy to said energy responsive means upon change in value of the condition to which said first condition responsive control device responds, a second condition responsive control device including a second energy varying means for varying the application of energy to said energy responsive means in accordance with changes in value of said second condition, said energy responsive means thereby responding to the resultant of said two conditions, and means actuated by one of said condition responsive devices for decreasing the relative effect thereof on said energy responsive means as said latter condition approaches a predetermined value, to thereby condition said other condition responsive device to control said device to be controlled substantially irrespective of the resultant of said conditions.

12. In a system of the class described, in combination, a device to be controlled and including an energy responsive means, a first condition responsive control device located remotely from said energy responsive means, said first condition responsive control device including a first energy varying means, energy transmitting means between said first energy varying means and said energy responsive means for causing said first condition responsive control device to vary the application of energy to said energy responsive means upon change in value of the condition to which said first condition responsive control device responds, a second condition responsive control device including a second energy varying means for varying the application of energy to said energy responsive means in accordance with changes in value of said second condition, said energy responsive means thereby responding to the resultant of said two conditions, and means actuated by one of said condition responsive devices for increasing the relative effect thereof on said energy responsive means when the value of the condition to which it responds becomes undesirable to permit actuation of said device to be controlled in a manner to return such condition to a more desirable value even though the resultant of the two conditions is not undesirable.

ALWIN B. NEWTON.